United States Patent
Sem et al.

(10) Patent No.: US 11,138,033 B1
(45) Date of Patent: Oct. 5, 2021

(54) PROVIDING AN APPLICATION PROGRAMMING INTERFACE (API) INCLUDING A BULK COMPUTING TASK OPERATION

(71) Applicant: Amazon Technologies, Inc., Seattle, WA (US)

(72) Inventors: SongPerk Sem, Seattle, WA (US); Jason Roy Rupard, Renton, WA (US); Aswin Damodar, Seattle, WA (US); Chetan Hosmani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 3 days.

(21) Appl. No.: 16/111,549

(22) Filed: Aug. 24, 2018

(51) Int. Cl.
*G06F 3/00* (2006.01)
*G06F 9/48* (2006.01)
*G06F 9/50* (2006.01)
*G06F 9/54* (2006.01)

(52) U.S. Cl.
CPC .......... *G06F 9/4806* (2013.01); *G06F 9/5038* (2013.01); *G06F 9/542* (2013.01)

(58) Field of Classification Search
CPC ...................................................... G06F 9/541
USPC ........................................................ 719/328
See application file for complete search history.

(56) References Cited

U.S. PATENT DOCUMENTS

| | | | | |
|---|---|---|---|---|
| 6,148,323 A * | 11/2000 | Whitner | .................. | G06F 11/28 714/E11.178 |
| 7,185,079 B1 * | 2/2007 | Bainbridge | ....... | H04L 29/12283 709/223 |
| 9,047,312 B1 * | 6/2015 | Ten-Pow | ................ | G06F 16/174 |
| 9,323,587 B2 * | 4/2016 | Hong | ....................... | H04L 67/16 |
| 2003/0033446 A1 * | 2/2003 | Noden | ....................... | G06F 8/30 719/328 |
| 2018/0121260 A1 * | 5/2018 | Nadig | .................. | G06F 9/44505 |
| 2019/0197538 A1 * | 6/2019 | Hamon | ................ | G06Q 20/102 |

OTHER PUBLICATIONS

Deng Zuojie, Overload control for parlay gateway in the next generation network. (Year: 2010).*
Jari K. Juntunen, WSN API: Application Programming Interface for Wireless Sensor Networks. (Year: 2006).*

* cited by examiner

*Primary Examiner* — Lechi Truong
(74) *Attorney, Agent, or Firm* — Nicholson De Vos Webster & Elliott LLP

(57) ABSTRACT

Techniques are described for providing an application programming interface (API) that includes a bulk computing task operation. A bulk computing task operation enables users to request performance of any number of computing tasks using a single API request. To submit a bulk task request, a user generates or causes the generation of bulk task data describing a plurality of computing tasks to be executed by an application or service, and causes the bulk task data to be stored at an accessible storage location. A single bulk task API request can be generated that includes an identifier of the storage location at which the corresponding bulk task data is stored. The submission of a bulk task API request results in a synchronous response to the requesting client including an identifier of the request that can be used to request status updates, while processing the request can occur asynchronously using backend resources.

19 Claims, 9 Drawing Sheets

BULK TASK API
REQUEST 300

```
POST /V1/SUBMITBULKCOMPUTEJOB HTTP/1.1
HOST: SERVICE.US-EAST.EXAMPLE.COM
ACCEPT-ENCODING: IDENTITY
CONTENT-LENGTH: 78
AUTHORIZATION: AUTHPARAMS
X-DATE: 20161129T201034Z
USER-AGENT: CLI/1.11.22 PYTHON/2.7.12 DARWIN/16.1.0 BOTOCORE/1.4.79

{
 "BULKJOBNAME": "BULKJOB1",
 "BULKJOBUSERID": "1001"
 "BULKJOBCHECKSUM": "292390132401"
 "BULKJOBFILE": "HTTP://STORAGE.EXAMPLE.COM/FILES/BULK_OPERATION_DATA.JSON"
}
```

*FIG. 3*

PROVIDING AN APPLICATION PROGRAMMING INTERFACE (API) INCLUDING A BULK COMPUTING TASK OPERATION

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which:

FIG. 3 illustrates an example structure of a bulk task API request according to some embodiments.

DETAILED DESCRIPTION

Figure 1:
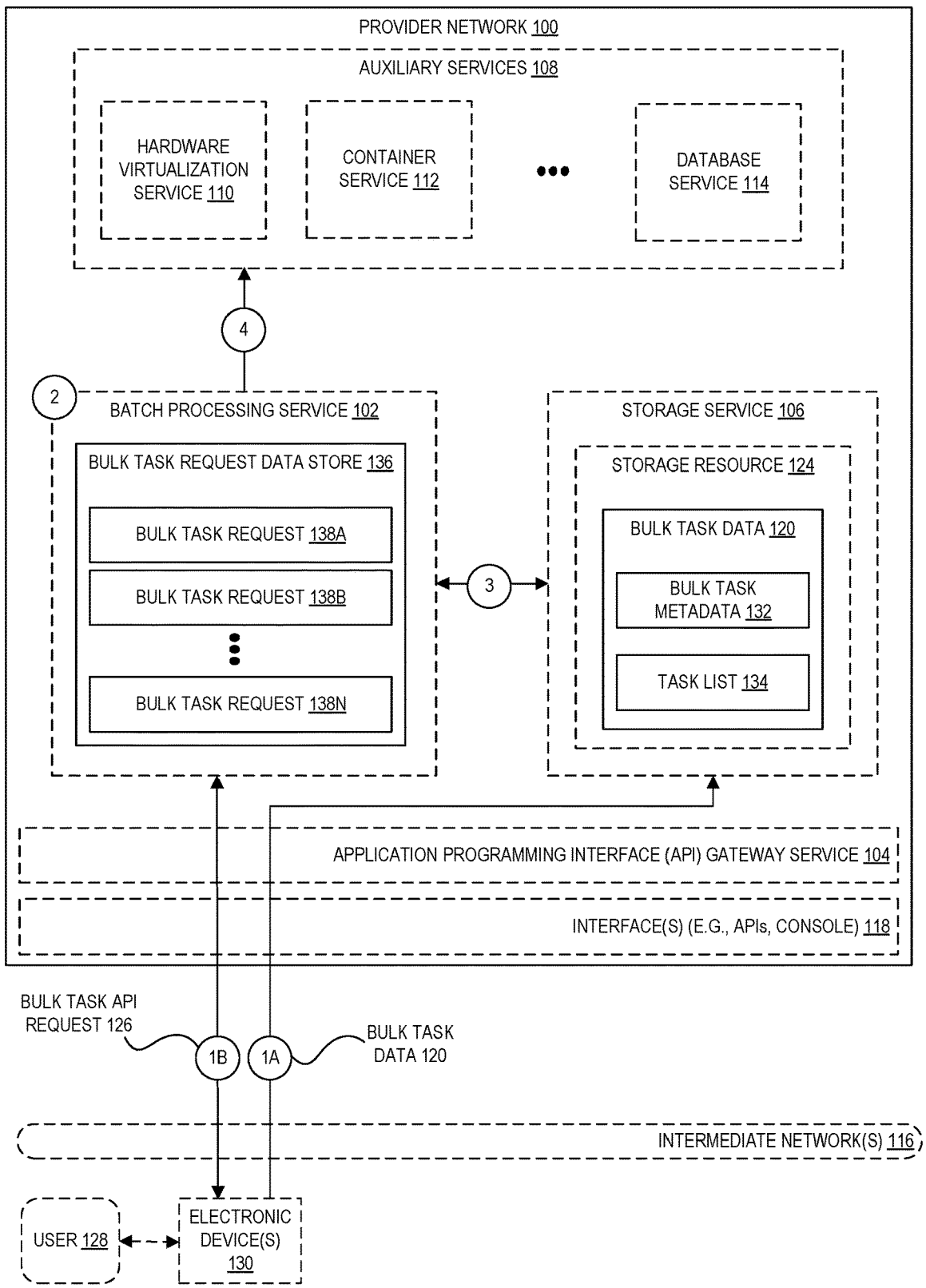
FIG. 1 is a diagram illustrating an environment for providing an application programming interface (API) that includes a bulk computing task operation according to some embodiments.

Various embodiments of methods, apparatus, systems, and non-transitory computer-readable storage media are described for providing an application programming interface (API) that includes a bulk computing task operation. Many different types of computing applications and services include one or more APIs that provide users with programmatic access to perform various types of operations related to the applications and services. For example, an API for a web-based service providing weather information might include a "get weather" operation that allows users to get the weather at a specified location, an "update weather" operation used to update the weather information for a location, and so forth. Typically, such operations are accessed using API requests having a defined structure (for example, an HTTP request with a payload having a defined structure in the example of a web-based API) and, in response to receiving a request, a structured response is sent back to the requesting client.

As another example, consider a service provider network that provides a batch processing service that is accessible via a public API, where the API can be implemented as part of the batch processing service or by a separate API service. An API for a batch processing service may include, among other operations, a "submit job" operation that enables users to submit requests specifying compute jobs desired for execution by the batch processing service. In response to receiving new compute job API requests, the batch processing service sends a response acknowledging receipt of the requests, and uses backend processes to plan, schedule, and execute the requested compute jobs by provisioning a quantity and type of compute resources (for example, CPU or memory optimized instances) based on the resource requirements of the compute jobs submitted. Once execution of the compute jobs is completed, the batch processing service scales down the resources used to execute jobs and awaits receipt of additional compute job requests.

In the example above, a compute job generally can be any unit of computing work (such as a shell script, an executable, or a container image) that a user submits to the batch processing service for execution. Each submitted compute job includes configuration information specifying, for example, a name or other identifier of the job, the job's memory and processing requirements, and an identifier of a location where the compute job is located (for example, a location of a shell script, executable, or container image). The compute jobs can be executed as containerized applications running on a compute instance in a defined compute environment. Defined compute jobs can also reference other jobs by name or by identifier, and can be dependent on the successful completion of other jobs. A compute job can be described using a job definition, which describes the job to be executed including any parameters, environmental variables, compute requirements, and other information that is used to execute a compute job.

In some cases, a user desires to send a large number of requests to an API in a short period of time. In the example above of a batch processing service, a user might desire to send a large number of "submit job" API requests to submit a large number of new compute jobs desired for execution by the batch processing service. To submit the compute jobs, the user can first configure the batch processing service to execute the jobs (for example, including configuring a compute environment to execute the jobs and creating a queue to receive the compute jobs) and then generate a separate API request for each compute job desired to be executed (for example, using a "submit job" API operation). However, attempting to submit a large number of API requests to an API in a short period of time can be problematic. For example, an application or service implementing an API often limits a rate at which API requests can be processed from a particular user or group of users, for example, by setting a limit on a steady-state rate and/or a burst of request submissions to avoid overwhelming the API. When a number of request submissions exceeds such limits, the service can fail the limit-exceeding requests and return error responses to the requesting client. Upon catching such exceptions, the client can resubmit the failed requests in a rate-limiting fashion. However, this system requires users of the service to programmatically implement their own processes to throttle the requests sent to the API, to monitor the success or failure of API requests, and to retry API requests that failed because of rate limiting or other issues, all which can be cumbersome and error-prone to implement.

According to embodiments described herein, instead of burdening users with generating and monitoring the submission of a large number of API requests in such cases, an application or service provides an API including an operation that enables users to request performance of any number of computing tasks using only a single API request, referred to herein as a bulk task API request. To submit a bulk task API request, a user generates or causes the generation of bulk task data that describes a plurality of computing tasks to be performed by an application or service and causes the bulk task data to be stored at a storage location accessible to the application or service. A single bulk task API request can then be generated that includes an identifier of the storage location at which corresponding bulk task data is stored. The application or service can then obtain the bulk task data from the identified storage location, and execute the computing tasks described in the bulk task data when resources are available and without burdening the user with submitting a large number of separate API requests to cause execution of the computing tasks. Among other benefits, the use of a bulk task request can significantly reduce API traffic and an amount of data included in API requests to perform any number of computing tasks.

FIG. 1 is a block diagram illustrating an environment for providing an API including a bulk computing task API operation according to some embodiments. In an embodiment, a batch processing service 102, an API gateway service 104, a storage service 106, and other auxiliary services 108 (including, for example, a hardware virtualization service 110, a container service 112, and a database service 114) operate as part of a service provider network 100 and each comprises one or more software modules executed by one or more electronic devices at one or more data centers and geographic locations. The service provider network 100 in FIG. 1 shows only a select number of services for illustrative purposes; in general, a service provider network 100 may provide many different types of computing services as part of the provider network.

A provider network 100 provides users with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage), network-related resources (for example, configuring virtual networks including groups of compute resources, content delivery networks (CDNs), Domain Name Service (DNS)), application resources (for example, databases, application build/deployment services), and so forth. These and other computing resources may be provided as services, such as a hardware virtualization service 110 that can execute compute instances, a storage service 106 that can store data objects, and so forth. The users (or "customers") of provider networks 100 may utilize one or more user accounts that are associated with a customer account, though these terms may be used somewhat interchangeably depending upon the context of use. Users may interact with a provider network 100 across one or more intermediate networks 116 (for example, the internet) via one or more interface(s) 118, such as through use of API calls, via a console implemented as a website or application, and so forth. The interface(s) 118 may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

In an embodiment, a batch processing service 102 is a service that executes queues or batches of separate compute jobs without manual intervention. In some embodiments, a batch processing service 102 uses other auxiliary services 108 of the service provider network 100 to execute compute jobs. For example, depending on the specifics of the compute jobs to be executed, a batch processing service 102 may use one or more compute instances provided by a hardware virtualization service 110, execute one or more containers using a container service 112, use one or more databases provided by a database service 114, or any other types of computing resources or combinations thereof.

As indicated above, a compute job generally can be any unit of computing work (such as a shell script, an executable, or a container image) that a user submits to a batch processing service 102 for execution. Each submitted compute job is associated with configuration information specifying, for example, a name or other identifier of the job, the job's memory and processing requirements, and an identifier of a location where the compute job is located (for example, a location of a shell script, executable, or container image). The compute jobs can be executed as containerized applications running on a compute instance in a defined compute environment. Jobs can also reference other jobs by name or by identifier, and can be dependent on the successful completion of other jobs. A compute job can be described using a job definition, which describes the job to be executed including any parameters, environmental variables, compute requirements, and other information that is used to execute a compute job. Although the example shown in reference to FIG. 1 involves using a bulk task API request to submit any number of compute jobs to a batch processing service 102, in general, similar processes can be used to submit a plurality of computing tasks to an application or service using only a single API request.

In some embodiments, a batch processing service 102 uses a separate API gateway service 104, which enables developers to create, publish, maintain, monitor, and secure APIs. As described above, an API generally acts as a "front door" for applications to access data, business logic, or functionality from a back-end service or application such as the batch processing service 102. An API gateway service 104 can handle many of the tasks involved in accepting and processing API requests, including traffic management, authorization and access control, monitoring, and API version management. In other examples, the API described herein can be implemented by the batch processing service 102 or by any other application or service that can interface with the batch processing service 102. As indicated above, the use of a API gateway service 104, or an API implemented by another application or service, can be subject to request rate limits and other possible restrictions.

As indicated above, it is desirable at times for users to submit a plurality of computing tasks (for example, compute jobs in the context of a batch processing service 102), in some cases thousands of computing tasks or more, near in time to one another for execution by one or more services of a service provider network. According to embodiments described herein, to enable users to generate a single API request to submit the plurality of computing tasks for execution, a user creates bulk task data 120 describing the set of computing tasks that the user desires to be executed by one or more services of the service provider network 100. The bulk task data 120 includes a task list 134 describing the computing tasks to be executed and optionally includes additional metadata 132 related to request and the set of computing tasks as a whole. As shown by the circle labeled "1A" in FIG. 1, in one embodiment, the bulk task data 120 can be sent to a storage service 106 for storage at a storage resource 124 provided by the storage service 106. In other examples, the bulk task data 120 generally can be stored at any location that is accessible to the application or service used to execute the computing tasks described in the data. For example, the bulk task data 120 can be stored as entries in a database, events in a queue, or in any other data format.

A user 128 can create the bulk task data 120 in a number of different ways and using any of a variety of interfaces. For example, a user 128 can manually create bulk task data 120 using any type of text editor or similar application running on electronic device(s) 130 (for example, a personal computer or other type of computing device) to create a text-based file that includes text describing each of the computing tasks to be executed according to a defined syntax and structure (for example, a file conforming to the JavaScript Object Notation (JSON) file format). In the example of a batch processing service 102, the file can be a bulk compute job file that uses a syntax to describe a plurality of compute jobs that can be the same or similar to a syntax that is defined by the batch processing service 102 for use when submitting individual compute jobs for execution. As another example, a user can use a CLI or web-based interface to create bulk task data 120 either by receiving manual input from the user or by prompting the user for various items of information which can be used to automatically construct the bulk task data 120.

The bulk task data 120 further optionally includes metadata information related to the bulk task request as a whole including, for example, a value indicating a total number of jobs or computing tasks described in the bulk task data, a checksum that can be used to check the integrity of the bulk task data, and so forth. In some embodiments, the bulk task data 120 can include information that is used to schedule the performance of jobs; for example, information used to specify a time or times at which the computing tasks specified in the data are to be executed. In an embodiment, users can also specify various dependencies between computing tasks described in the bulk task data 120, for example, such that the output of an executed computing task serves as input for one or more other computing tasks. A user can create dependencies between computing tasks in the bulk task data 120 using variable identifiers for each of the computing tasks (which a batch processing service 102 can replace with actual identifiers once processed) or using any other syntax to relate various computing tasks.

As shown in FIG. 1, the bulk task data 120 can be stored at a storage resource 124 of a storage service 106 of the service provider network 100. For example, the user 128 can generate a request to upload the bulk task data 120 to a "bucket" or folder created by the user manually or automatically at the storage service 106 and, in return from the storage service 106, receive a Uniform Resource Locator (URL) or other identifier of the location at which the data is stored. In some embodiments, the URL can be a "pre-signed" URL which grants time-limited permission to one or more other entities to access (for example, to download or copy) the data stored at the location identified by the pre-signed URL. In other examples, the bulk task data 120 can be stored at the storage service 106 or another storage location for a user automatically in response to receiving input from the user defining the bulk task data 120.

Figure 2:
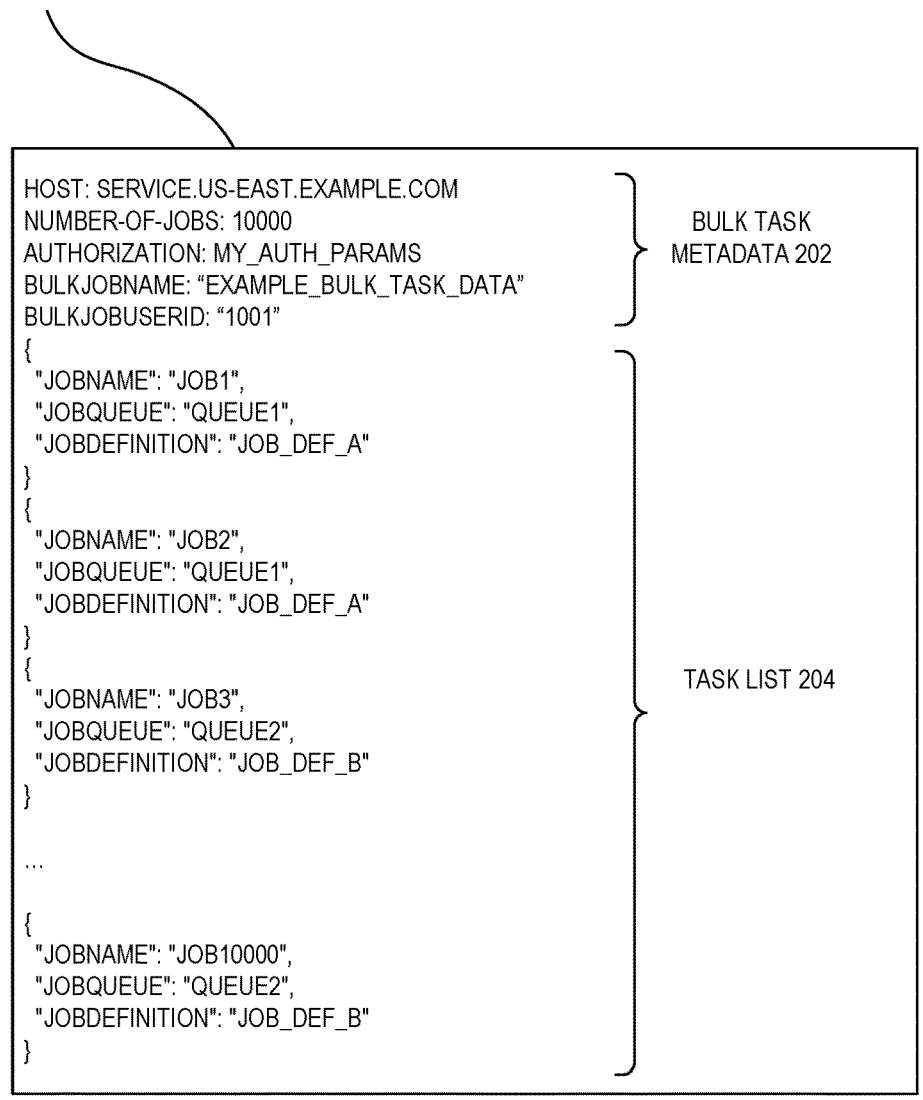
FIG. 2 illustrates an example of bulk task data according to some embodiments.

FIG. 2 is an example of bulk task data. As shown in FIG. 2, the example bulk task data 200 includes bulk task metadata 202 and a task list 204. The bulk task metadata 202 specifies various information about the request as a whole such as, for example, a host that is intended to process the request ("service.us-east.example.com"), a total number of computing tasks to be executed ("10000"), user authorization information, and a name used to identify the bulk task data ("EXAMPLE_BULK_TASK_DATA"). The example bulk task data 200 further includes a task list 204 specifying a list of separately defined computing tasks desired for execution. In the example shown in FIG. 2, each of the computing tasks is a compute job desired for execution by a batch processing service 102 of a service provider network 100. For example, a first computing task definition includes a name used to identify the computing task (for example, "JOB1"), a queue into which the computing task is to be placed for execution (for example, "QUEUE1"), and reference to a job definition upon which the computing task is based (where the job definition can include a reference to the shell script, container, or other executable used to execute the compute job).

In one embodiment, a bulk task data 200 can also include a user-generated identifier of the request (for example, "BULKJOBUSERID: '1001'" as shown in FIG. 2). The user-generated identifier of the request can used by the receiving service, for example, to ensure that each received bulk task request is unique and that a user has not accidentally submitted a same bulk task request multiple times. Each bulk task request may initiate the processing of a large number of computing tasks and thus the accidental resubmission of a same bulk task request may be costly to a user.

Referring again to FIG. 1, in an embodiment, at circle "1B," a user generates a bulk task API request 126. For example, a user can use a web-based GUI, CLI, or any other type of interface to generate the bulk task API request 126, which may be the same interface or a different interface as that used to generate and store the bulk task data 120. In some embodiments, the same input or input sequence can be used to send the bulk task data 120 to the storage service 106, and to generate the bulk task API request 126. For example, a same set of graphical user interfaces (GUIs) or sequence of CLI prompts can be used to both cause the creation and storage of the bulk task data 120 at the storage service 106 (or other storage location) and the generation of the bulk task API request 126 sent to the batch processing service 102.

In an embodiment, a bulk task API request 126 includes an identifier of a storage location storing the bulk task data 120 describing a plurality of computing tasks to be executed. For example, the bulk task API request 126 can include a URL or other identifier of a storage resource 124 used to store the bulk task data 120. In some embodiments, the bulk task API request 126 includes additional parameters indicating, for example, a user account associated with the request, authorization parameters, date and time information, and so forth.

In some embodiments, a bulk task request 126 can also include the user-generated identifier included in the bulk task data, as described above, and a checksum associated with the corresponding bulk task data 120. The checksum can be used, for example, to verify the integrity of bulk task data 120 associated with the bulk task request 126 to ensure that the bulk task data contains the entire set of computing tasks desired for execution by the requesting user and is otherwise formatted as the user intended.

FIG. 3 illustrates an example of a bulk task API request. The example bulk task API request 126 shown in FIG. 3, for example, may be included in an HTTP request sent to the batch processing service 102 (possibly via a backend request generated by the API gateway service 104 initially receiving the request). As shown in FIG. 3, the example bulk task API request 126 includes header information specifying, for example, a host to which the request is being sent, user authorization details, a time and date at which the request was generated, and user agent information, among other possible parameters. The example bulk task API request 126 further specifies as payload a name used to identify the bulk task request (for example, "BULKJOB1"), a user-generated identifier of the bulk task request (for example, "1001"), a user-provided checksum for the request (for example, "292390132401"), and an identifier of a storage location storing the bulk task data describing the computing tasks requested for execution (for example, "http://storage.example.com/files/bulk_operation_data.json").

Figure 4:
FIG. 4 illustrates an example structure of a bulk task API response according to some embodiments.

In an embodiment, in response to receiving a bulk task API request 126, the batch processing service 102 acknowledges receipt of the request by generating an identifier of the request and sending a response including the service-generated identifier and, optionally, the user-generated identifier of the request back to the requesting computing device 130. FIG. 4 illustrates an example structure of a bulk task response 400. As shown in FIG. 4, an example bulk task response 400 includes header information specifying, for example, a content type of the response (for example, "APPLICATION/JSON" to indicate that the response data is JSON-formatted data) and a date and time at which the response was generated, among other possible parameters. The example bulk task response 400 further includes as payload data specifying the name of the bulk task (for example, again "BULKJOB1"), the user-generated identifier of the request (for example, again "1001"), and the service-generated identifier of the bulk task request (for example, "876da822-4198-45f2-a252-6cea32512ea8").

At circle "2" in FIG. 1, the batch processing service 102 further processes the bulk task API request 126. In an embodiment, the batch processing service 102 processes a bulk task API request 126 in part by, at circle "3," obtaining a copy of the bulk task data 120 from the storage resource 124, storing a record representing the bulk task API request 126 in a bulk task request data store 136, and processing the bulk task request when resources are available. For example, in response to receive the bulk task API request 126 in FIG. 1, the batch processing service 102 may store a record (one of the bulk task request records 138A-138N) in a database or other type of data store including an identifier of the request and optionally including a copy of the associated bulk task data 120. Although in the example of FIG. 1, the bulk task request data store 136 is shown as part of the batch processing service 102, in other examples the bulk task request data store 136 can be part of another service of the service provider network 100 or located anywhere accessible to the batch processing service 102.

In one embodiment, the processing of bulk task requests by the batch processing service 102 is event-driven, where the addition of a record to the bulk task request data store 136 causes the request to be added to a queue for processing. In an embodiment, each of the bulk task request records 138A-138N is further associated with state information indicating, for example, whether the request is pending, in-progress, has failed, is being retried, and so forth. In this manner, a bulk task API request 126 is processed asynchronously and without a user submitting a separate API request for each computing task to be executed, and the status of request can be obtained using an identifier associated with the request.

In an embodiment, a batch processing service 102 can obtain the bulk task data 120 from the storage service 106 using a URL to download the bulk task data from the storage location, by sending an API request to the storage service 106 using an identifier of the bulk task data, or using any other process for obtaining the bulk task data. The batch processing service 102 can store a copy of the bulk task data 120 locally or refer only to the copy of the bulk task data 120 stored at the storage service 106.

In an embodiment, the processing of the bulk task request 126 can include verifying the request in various ways, including determining whether a user-generated identifier included in the request is not associated with an earlier received request from the same user, and verifying that the user-provided checksum matches the obtained bulk task data 120. For example, if the batch processing service 102 determines that the user-generated identifier is the same as a earlier received request, or that the user-provided checksum does not match the obtained bulk task data, the service can update state data associated with the request to indicate that the request is invalid and will not be processed, or can request that the user modify the request by providing valid request parameters, or both.

In an embodiment, at circle "4," the batch processing service 102 uses one or more services of the provider network 100 to execute each of the computing tasks described in the bulk task data 120. In an embodiment, the batch processing service 102 plans, schedules, and executes the computing tasks specified in the bulk task data 120 by provisioning a quantity and type of compute resources (for example, CPU or memory-optimized compute instances provided by a hardware virtualization service 110) based on the resource requirements of the computing tasks submitted. Once completed, the batch processing service 102 scales down the resources used to execute the computing tasks and awaits receipt of additional bulk task API requests. In one embodiment, the batch processing service 102 executes the computing tasks specified in the bulk task data 120 in an order based on the order listed in the data, according to any associated dependencies, and so forth. In an embodiment, the batch processing service 102 updates status information associated with the corresponding bulk task request as the bulk task data is processed, for example. In other examples, the status information is updated in response to status requests.

Figure 5:
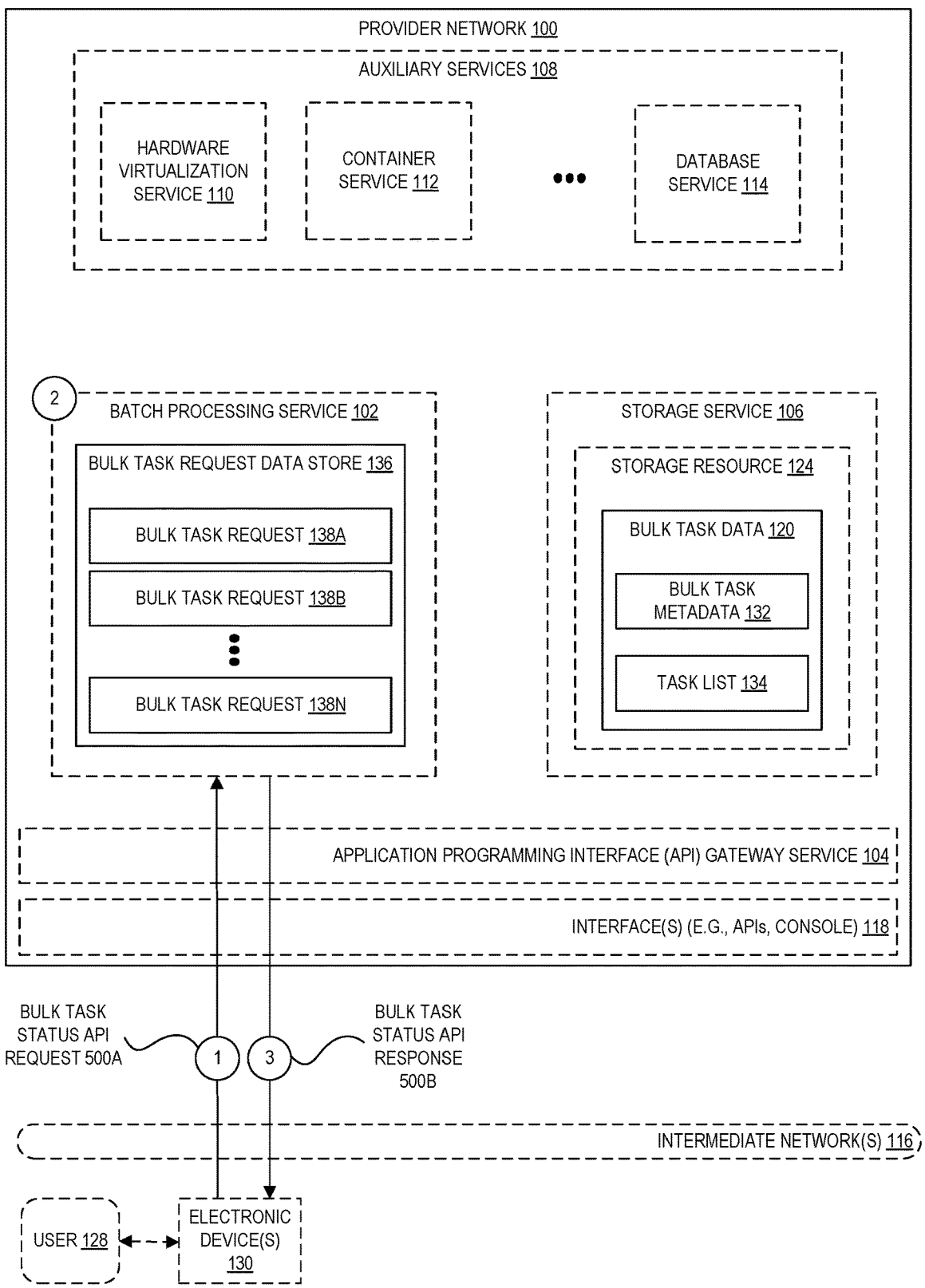
FIG. 5 is a diagram illustrating an environment for providing an API that includes a bulk task status operation according to some embodiments.

FIG. 5 is a diagram illustrating an environment for providing an API that includes a bulk task status API operation. Similar to FIG. 1, in FIG. 5, a batch processing service 102, an API gateway service 104, a storage service 106, and other auxiliary services operate as part of the service provider network 100. In an embodiment, at circle "1" in FIG. 5, a user 128 uses a computing device 130 to generate a bulk task status API request 500A. As indicated above, a bulk task status API request 500A can include, among other possible parameters, an identifier of a previously submitted bulk task API request generated by the batch processing service 102.

In an embodiment, at circle "2," the batch processing service 102 receives (possibly via the API gateway service 104) and processes the bulk task status API request 500A. The batch processing service 102 processes a bulk task status API request by locating a bulk task record corresponding to the bulk task status API request 500A in the bulk task request data store 136 (for example, by using the bulk task request identifier included in the bulk task status API request 500A to identify one of the bulk task API request records 138A-138N) and obtains status information associated with the located bulk task record. In an embodiment, example status indicators include request failed (for example, because the bulk task API request was formatted incorrectly), request error (for example, because some or all of the bulk task data was formatted incorrectly), invalid bulk task data identifier (for example, because a URL or other identifier to a storage location of the bulk task data was incorrect), request in-progress (for example, including an indication of a number of computing tasks that have been executed out of the total number of tasks to execute), request complete (for example, to indicate that all computing tasks described in the bulk task data executed without error). At circle "3," the batch processing service 102 sends a bulk task status API response 500B back to the requesting computing device 130, where the response includes the requested status information.

In an embodiment, a bulk task status API response 500B can include a list of the computing tasks (for example, compute jobs) that are part of the bulk task request and an identifier that can be used to identify each of the computing tasks individually. The identifiers of each of the computing tasks may be created, for example, when the batch processing service 102 processes the bulk task data 120 and identifies the set of computing tasks to be executed. An identifier of each of the individual computing tasks in the bulk task data 120 can be used, for example, to request further status information about one or more individual computing tasks. For example, based on the identifiers of computing tasks returned in a bulk task status API response 500B, a user can submit one or more additional computing task status API requests to request information specific to one or more of the individual computing tasks. In other embodiments, status information for each of the individual computing tasks can be included in the bulk task status API response 500B.

Figure 6:
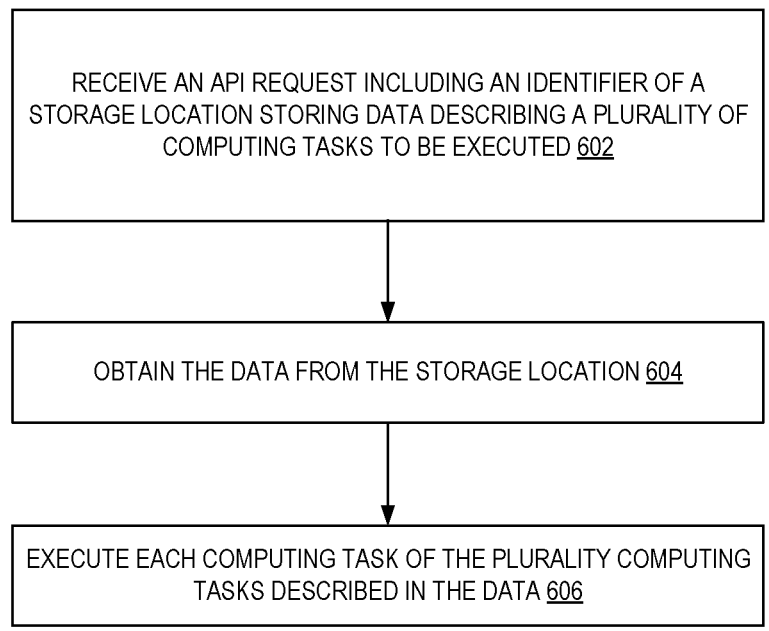
FIG. 6 is a flow diagram illustrating operations of a method for processing a bulk task API request according to some embodiments.

FIG. 6 is a flow diagram illustrating operations 600 of a method for providing an application programming interface (API) that includes a bulk computing task operation according to some embodiments. Some or all of the operations 600 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by a batch processing service 102 and other possible components of the other figures.

The operations 600 include, at block 602, receiving an API request including an identifier of a storage location storing data describing a plurality of computing tasks to be executed. In an embodiment, the data includes a separate element describing each of the plurality of computing tasks to be executed, and the data further includes metadata related to the request. Referring to FIG. 1, for example, a user can generate a bulk task API request 126 that is sent to a batch processing service 102. The bulk task API request 126 can include an identifier (for example, a URL) of a storage location (for example, a storage resource 124) storing data describing a plurality of computing tasks to be executed (for example, bulk task data 120). As shown in FIG. 2, a task list 204 can include a separate element for each computing task desired for execution and can further include bulk task metadata 202 related to the request. In one embodiment, the data is a bulk compute job file that specifies a plurality of compute jobs to be executed by a batch processing service of a service provider network.

In an embodiment, data identifying the API request is stored and a response is sent back that includes an identifier of the API request. For example, in response to receiving a bulk task API request, a batch processing service 102 can store a bulk task request record or other type of data in a bulk task request data store 136, and can generate a response to a requesting electronic device 130 including an identifier generated for the request.

In one embodiment, the computing tasks are compute jobs to be executed by a batch processing service of a service provider network. For example, a batch processing service 102 can use one or more auxiliary services 108 of a service provider network to execute the computing tasks defined in bulk task data 120. In other examples, an application or service can execute the computing tasks on its own or in coordination with other types of applications or services depending on the nature of the computing tasks.

In one embodiment, the API request is received by an API service that throttles a rate at which API requests can be received. For example, a bulk task API request may be received by an API gateway service 104 that imposes limits on a rate at which API requests can be received and processed from individual users or groups of users.

The operations 600 further include, at block 604, obtaining the data from the storage location. In one embodiment, the data is a file and the file is stored at a storage location provided by a storage service of a service provider network. In an embodiment, the data is added to a queue and processed when resources are available to execute each computing task of the plurality of computing tasks described in the data. For example, a batch processing service 102 can obtain bulk task data 120 from a storage service 106 or other location at which the bulk task data is stored.

In an embodiment, it is determined that the data contains one or more formatting errors, and status information is stored in association with the API request indicating that the data contains one or more formatting errors. For example, a batch processing service 102 may analyze and validate bulk task data 120 as part of executing the computing tasks and may identify the presence of one or more formatting errors in the data. The batch processing service 102 can store the status information indicating the formatting errors in association with a corresponding bulk task request record in a bulk task request data store 136.

The operations 600 further include, at block 606, executing each computing task of the plurality of computing task described in the data. In an embodiment, executing each computing task of the plurality of computing tasks includes using one or more services of a service provider network. For example, a batch processing service 102 can use one or more of a hardware virtualization service 110, container service 112, database service 114, or any other set of one or more services of a service provider network 100 to execute the computing tasks.

In an embodiment, a status API request is received including an identifier associated with the API request, and status information related to execution of the plurality of computing tasks is sent. In an embodiment, the status information includes one or more of: request pending, request failed, request errors, invalid bulk task identifier, request in-progress, request completed.

Figure 7:
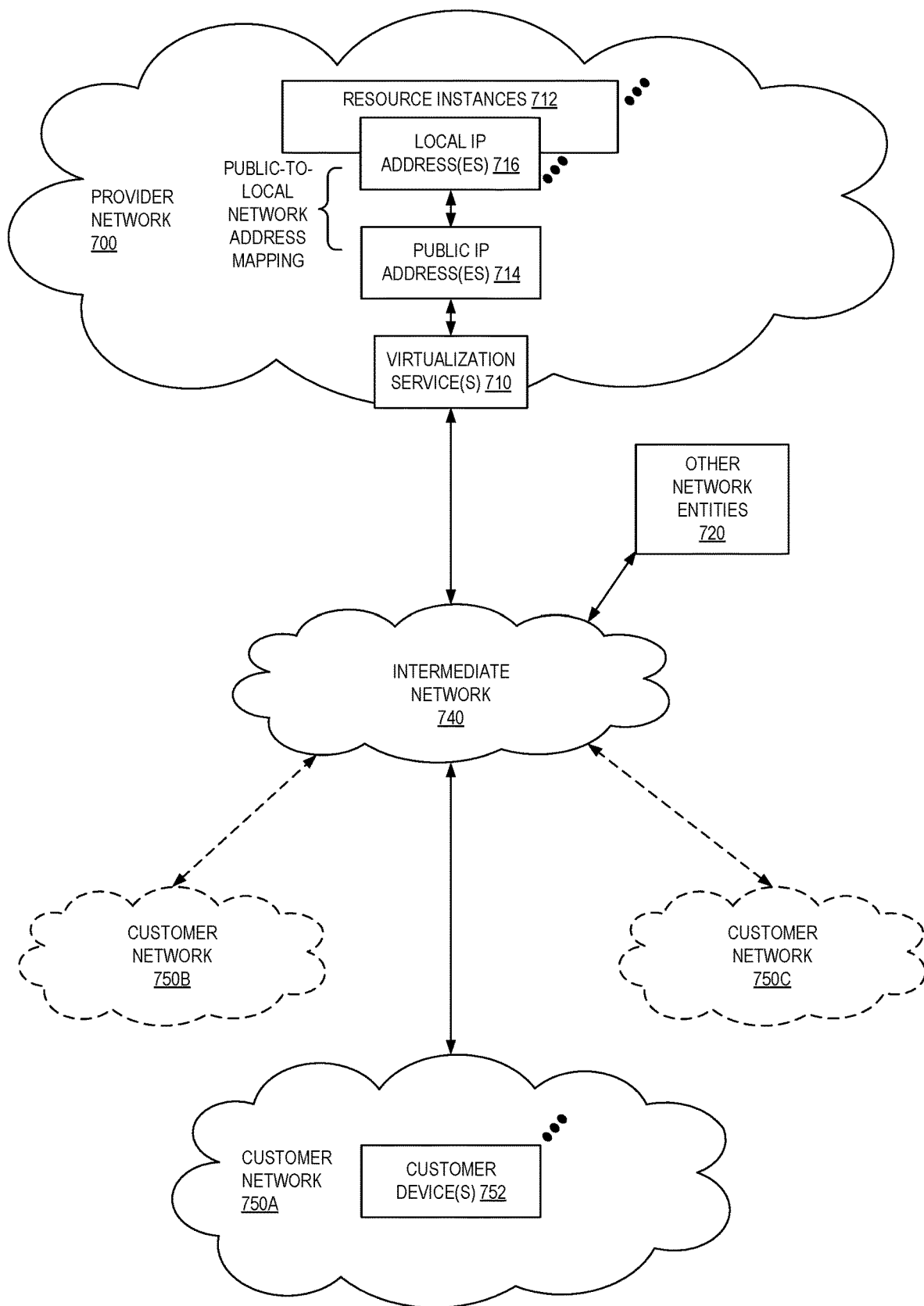
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (for example, Internet Protocol version 4 (IPv4) or Internet Protocol version 6 (IPv6) addresses) that customers may obtain from the provider 700.

Conventionally, the provider network 700, via the virtualization services 710, may allow a customer of the service provider (for example, a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
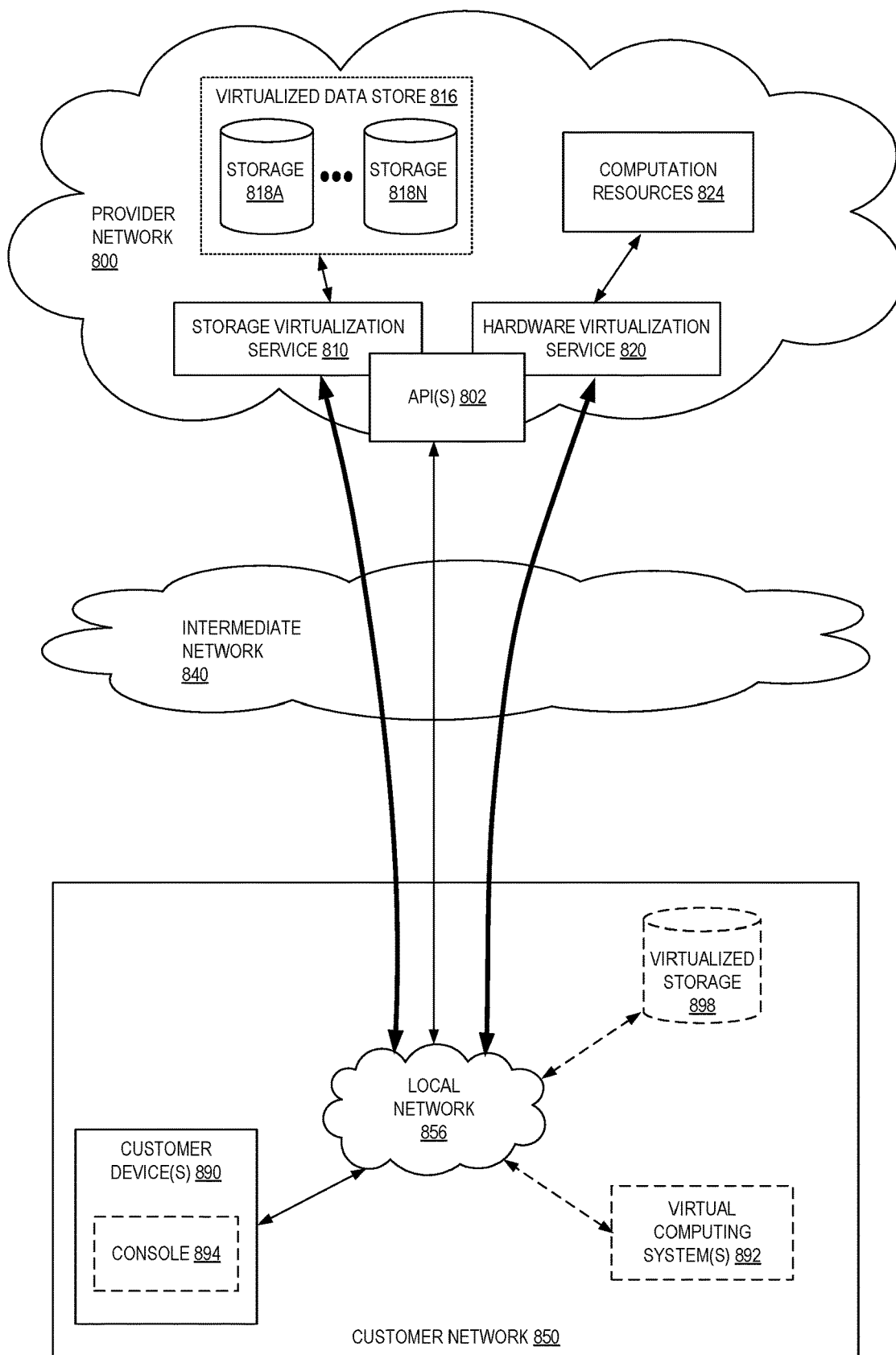
FIG. 8 is a block diagram of an example provider network that provides a storage virtualization service and a hardware virtualization service to customers according to some embodiments.

FIG. 8 is a block diagram of an example provider network that provides a storage virtualization service and a hardware virtualization service to customers, according to some embodiments. Hardware virtualization service 820 provides multiple computation resources 824 (for example, VMs) to customers. The computation resources 824 may, for example, be rented or leased to customers of the provider network 800 (for example, to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (for example, a web-based application, standalone application, mobile application, and so forth). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (for example, via console 894), the customer may access the functionality of storage virtualization service 810, for example via one or more APIs 802, to access data from and store data to storage resources 818A-818N of a virtual data store 816 provided by the provider network 800. In some embodiments, a virtualized data store gateway (not shown) may be provided at the customer network 850 that may locally cache at least some data, for example frequently accessed or critical data, and that may communicate with virtualized data store service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes, which appear to the user as local virtualized storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
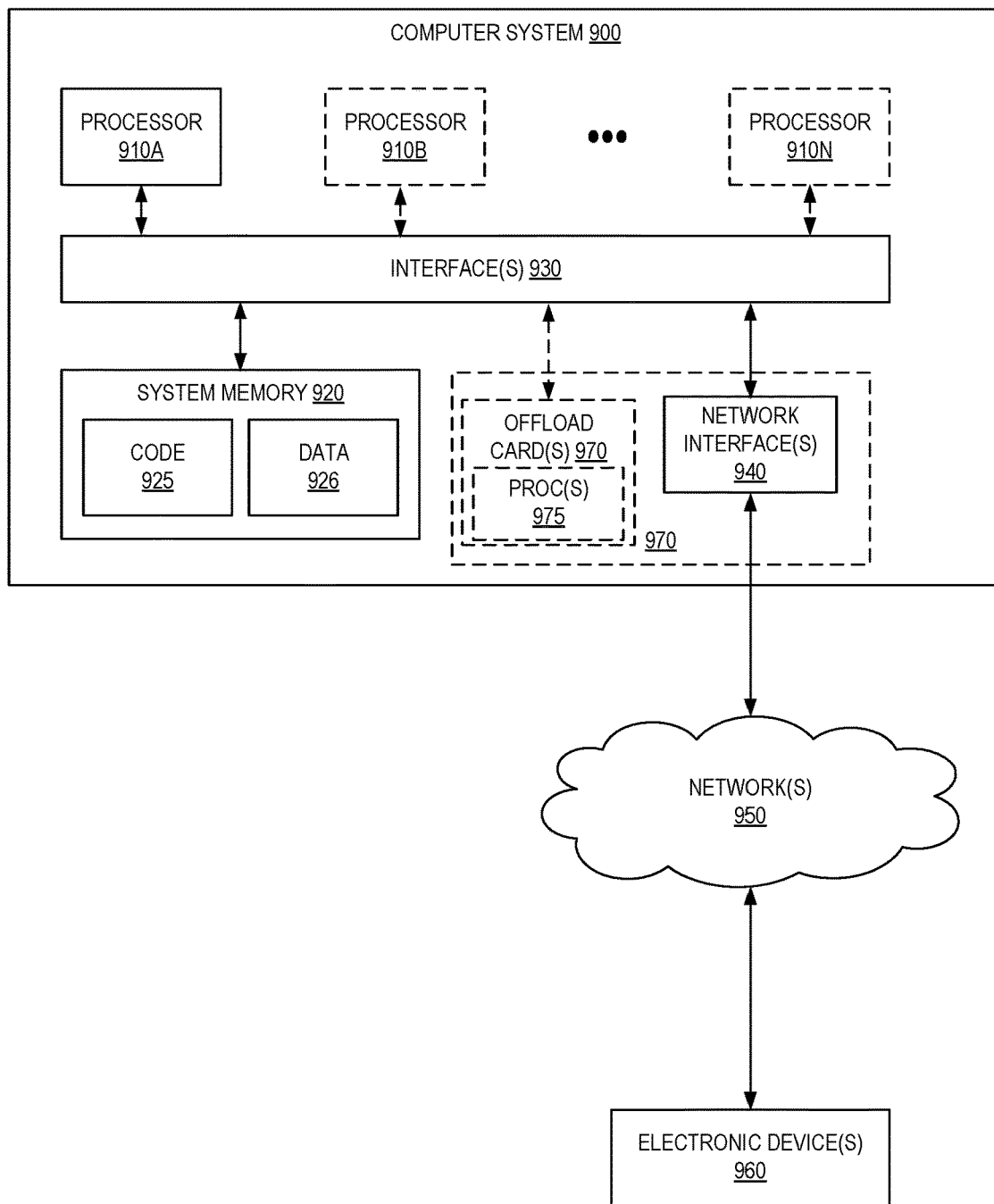
FIG. 9 is a block diagram illustrating an example computer system that may be used in some embodiments.

In some embodiments, a system that implements a portion or all of the techniques for providing an application programming interface (API) that includes a bulk computing task operation as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (for example, two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing an application programming interface (API) that includes a bulk computing task operation, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (for example, system memory 920) into a format suitable for use by another component (for example, processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (for example, a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (for example, operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, and so forth. These management operations may, in some embodiments, be performed by the offload card(s) 970 in coordination with a hypervisor (for example, upon a request from a hypervisor) that is executed by the other processors 910A-910N of the computer system 900. However, in some embodiments the virtualization manager implemented by the offload card(s) 970 can accommodate requests from other entities (for example, from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, for example, disk or DVD/CD coupled to computer system 900 via I/O interface 930. A non-transitory computer-accessible storage medium may also include any volatile or non-volatile media such as RAM (for example, SDRAM, double data rate (DDR) SDRAM, SRAM, and so forth), read only memory (ROM), and so forth, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (for example, large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (for example, 138A-138N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (for example, A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by an application programming interface (API) gateway service, a bulk compute job API request including an identifier of a storage location storing a bulk compute job file, wherein the bulk compute job file includes a description of a plurality of compute jobs to be executed by a batch processing service of a service provider network, and wherein the API gateway service is associated with a throttling limit on a rate at which a number of API requests can be received by the API gateway service;
   storing data identifying the bulk compute job API request;
   sending a response that includes an identifier of the bulk compute job API request;
   generating a request to the batch processing service including the identifier of the storage location;
   receiving, by the batch processing service, the request including the identifier of the storage location;

obtaining, by the batch processing service, the bulk compute job file from the storage location; and executing, by the batch processing service, each compute job of the plurality of compute jobs described in the bulk compute job file.

2. The computer-implemented method of claim 1, wherein the bulk compute job file includes a separate element describing each of the plurality of compute jobs to be executed, and wherein the bulk compute job file further includes one or more of: a user-generated identifier of the bulk compute job API request, a checksum associated with the bulk compute job file, and a value indicating a number of compute jobs included in the bulk compute job file.

3. The computer-implemented method of claim 1, further comprising:

receiving a bulk compute job status API request including an identifier associated with the bulk compute job API request; and sending status information related to execution of the plurality of compute jobs.

4. A computer-implemented method comprising:

receiving a bulk compute job application programming interface (API) request including an identifier of a storage location storing first data describing a plurality of computing tasks to be executed, wherein the bulk compute job API request is received by an API gateway service, and wherein the API gateway service is associated with a throttling limit on a rate at which a number of API requests can be received by the API gateway service;

storing second data identifying the bulk compute job API request;

sending a response that includes an identifier of the bulk compute job API request;

generating a request to a batch processing service including the identifier of the storage location;

receiving, by the batch processing service, the request including the identifier of the storage location;

obtaining, by the batch processing service, the first data from the storage location; and executing, by the batch processing service, each computing task of the plurality of computing tasks described in the first data.

5. The computer-implemented method of claim 4, wherein the first data includes a separate element describing each of the plurality of computing tasks to be executed, and wherein the first data further includes one or more of: a user-generated identifier of the bulk compute job API request, a checksum associated with the first data, and a value indicating a number of the computing tasks included in the first data.

6. The computer-implemented method of claim 4, further comprising causing execution of the plurality of computing tasks using one or more services of a service provider network.

7. The computer-implemented method of claim 4, wherein the first data is a file, and wherein the file is stored at a storage location provided by a storage service of a service provider network.

8. The computer-implemented method of claim 4, wherein the plurality of computing tasks are compute jobs to be executed by a batch processing service of a service provider network.

9. The computer-implemented method of claim 4, further comprising:

receiving a status API request including an identifier associated with the bulk compute job API request; and sending status information related to execution of the plurality of computing tasks.

10. The computer-implemented method of claim 4, further comprising sending status information related to execution of the plurality of computing tasks, the status information including one or more of: request pending, request failed, request errors, invalid bulk task identifier, request in-progress, or request completed.

11. The computer-implemented method of claim 4, wherein the first data is added to a queue and processed when resources are available to execute each computing task of the plurality of computing tasks described in the first data.

12. The computer-implemented method of claim 4, further comprising:

determining that the first data contains one or more formatting errors; and storing status information in association with an identifier of the bulk compute job API request indicating that the first data contains the one or more formatting errors.

13. A system comprising:

a first one or more electronic hardware devices to implement an application programming interface (API) gateway service, the API gateway service including instructions that upon execution cause the API gateway service to:

receive a bulk compute job API request including an identifier of a storage location storing first data describing a plurality of computing tasks to be executed by one or more computing services of a service provider network, wherein the bulk compute job API request is received by an API gateway service, and wherein the API gateway service is associated with a throttling limit on a rate at which a number of API requests can be received by the API gateway service; and generate a backend request to a batch processing service including the identifier of the storage location; and a second one or more electronic hardware devices to implement the batch processing service, the batch processing service including instructions that upon execution cause the batch processing service to:

receive the backend request including the identifier of the storage location;

obtain the first data from the storage location;

use the one or more computing services of the service provider network to execute each computing task of the plurality of computing tasks described in the first data;

store second data identifying the bulk compute job API request; and send a response that includes an identifier of the bulk compute job API request.

14. The system of claim 13, wherein the first data includes a separate element describing each of the plurality of computing tasks to be executed, and wherein the first data further includes one or more of: a user-generated identifier of the bulk compute job API request, a checksum associated with the first data, and a value indicating a number of computing tasks included in the first data.

15. The system of claim 13, wherein the first data is a file, and wherein the file is stored at a storage location provided by a storage service of the service provider network.

16. The system of claim 13, wherein the batch processing service further includes instructions that upon execution cause the batch processing service to:

receive a status API request including an identifier associated with the bulk compute job API request; and send status information related to execution of the plurality of computing tasks.

17. The system of claim 13, wherein the batch processing service further includes instructions that upon execution cause the batch processing service to send status information related to execution of the plurality of computing tasks, the status information including one or more of: request pending, request failed, request errors, invalid bulk task identifier, request in-progress, or request completed.

18. The system of claim 13, wherein the first data is added to a queue and processed when resources are available to execute each computing task of the plurality of computing tasks described in the first data.

19. The system of claim 13, wherein the batch processing service further includes instructions that upon execution cause the batch processing service to:

determine that the first data contains one or more formatting errors; and store status information in association with an identifier of the bulk compute job API request indicating that the first data contains the one or more formatting errors.

* * * * *